Patented June 14, 1949

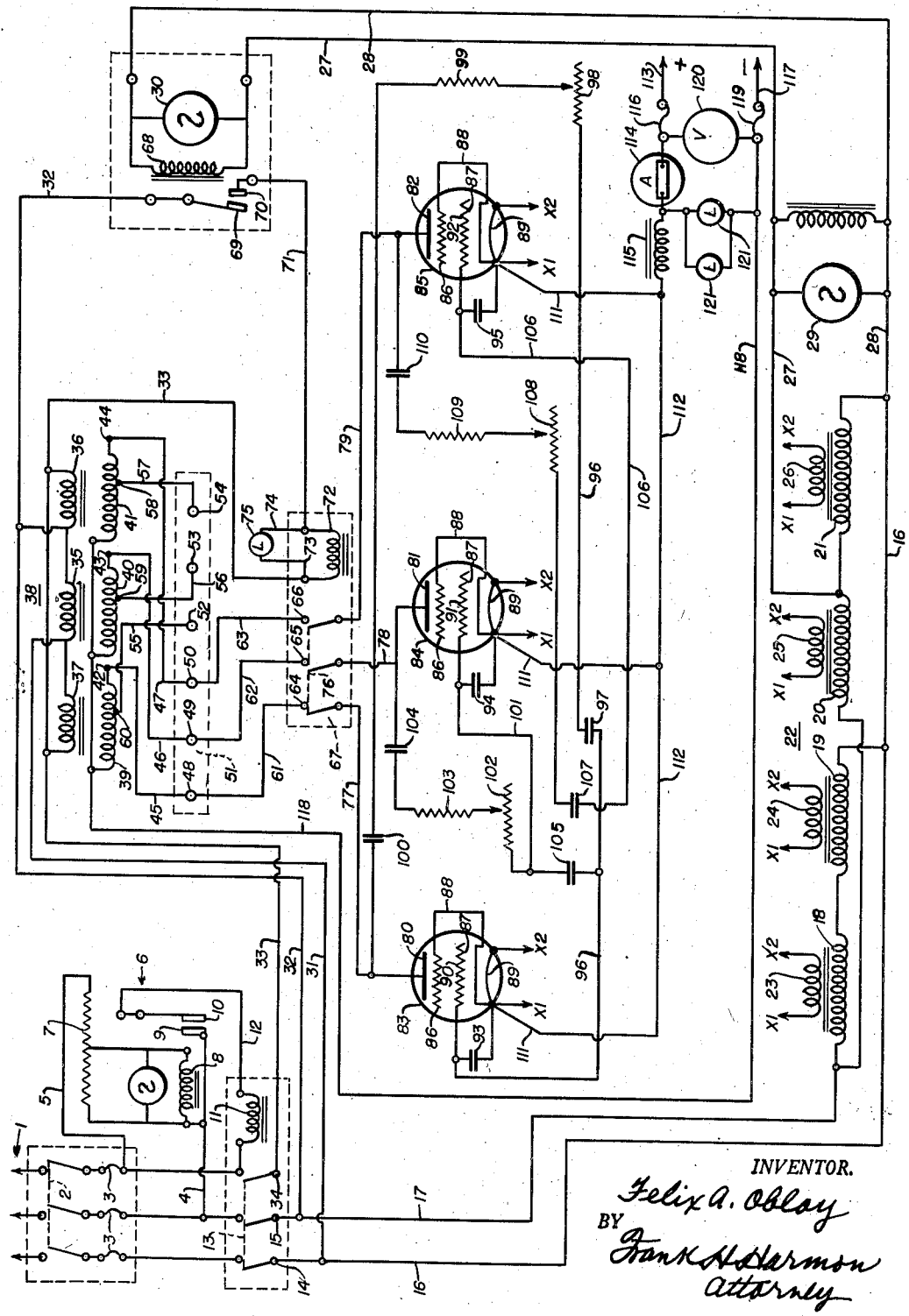

2,473,386

UNITED STATES PATENT OFFICE 2,473,386

GRID CONTROLLED POLYPHASE RECTIFIER

Felix A. Obloy, Garfield Heights, Ohio

Application July 24, 1947, Serial No. 763,218

10 Claims. (Cl. 321—11)

This invention relates to polyphase alternating current rectifiers and has for a primary object to provide a rectifier with circuits that will provide a self regulated constant direct current output under changing load conditions.

A more particular object of the invention is to provide a polyphase A. C. rectifier with a polyphase-shift grid control circuit for obtaining a self regulated constant voltage D. C. output under changing load conditions.

Another object of the invention is to provide a polyphase A. C. rectifier in which the self regulated output D. C. voltage is not affected by line voltage fluctuations.

A further object of the invention is to provide a polyphase A. C. rectifier with time delay circuits to insure maximum tube life and efficiency.

Another object of the invention is to provide a polyphase A. C. rectifier with a polyphase shift grid control circuit in which the grid control stability is unaffected by changing load conditions.

A more specific object of the invention is to provide a polyphase A. C. rectifier incorporating auxiliary time delay circuits to permit the various tube cathodes to be heated sufficiently before the rectifier will deliver current to a load.

This rectifier has been particularly useful in connection with D. C. motors driving heavy machine tools. It will promote and give a linear torque curve performance even under constantly changing load conditions on such machines. As a result a smoother finish is obtained on the work pieces by the machine tool and in many instances the finish is fine enough to preclude additional surface finishing operations.

With the aforementioned and other objects in view the invention resides in the combination of parts and details of construction set forth in the following specification and appended claims, certain embodiments thereof being schematically shown in the accompanying drawing which is a schematic circuit layout of one form of the invention.

A three phase power system 1 is shown leading into a main switch 2. Suitable fuses 3 are provided in the switch. Connected to one phase of the power supply 1 through switch 2 by means of lines 4 and 5 is a time clock 6. Upon manual closing of switch 2 time clock 6 is energized with a stepped down voltage by means of a voltage divider 7. When the "On" setting of the time clock is reached, relay 8 is energized sufficiently to close contacts 9 and 10 which in turn energizes relay 11 through line 12.

When relay 11 is energized switch 13 is closed and A. C. current is then available to supply the rectifier. Series-parallel connected to terminals 14 and 15 by lines 16 and 17 respectively are the primary coils 18, 19, 20 and 21 of a transformer 22. Secondary coils 23, 24, 25 and 26 furnish a cathode heater supply source. Directly connected across primary coil 21 by lines 27 and 28 is a cooling fan 29. Lines 27 and 28 also feed a second time clock 30.

Connected by lines 31, 32 and 33 to terminals 14, 15 and 34 of switch 13 are the primary coils 35, 36 and 37 of 3 single phase transformers 38 delta connected. The secondaries 39, 40 and 41 are connected to maximum power taps 42, 43 and 44. These taps are connected by lines 45, 46 and 47 to terminals 48, 49 and 50 on terminal block 51. Also provided on block 51 are terminals 52, 53 and 54 which are connected by lines 55, 56 and 57 respectively to taps 58, 59 and 60 which in turn are positioned equally at less than the full power setting on each secondary 39, 40 and 41. Terminals 48, 49 and 50 are further connected by lines 61, 62 and 63 to terminals 64, 65 and 66 respectively, by a switch block 67.

When time clock 30 reaches its "On" setting, coil 68 is energized and closes a pivoted contact 69 against fixed contact 70. Current then flows from line 32 through a line 71 to a relay coil 72. The other side of the coil is connected to line 33. Connected across lines 33 and 71 by lines 73 and 74 is a panel light 75. When relay coil 72 is energized a switch 76 is closed against terminals 64, 65 and 66. This closing permits current from lines 61, 62 and 63 to flow past the switch block 67 to lines 77, 78 and 79 which are jointed to the plates 80, 81 and 82 of rectifier tubes 83, 84 and 85, respectively.

Each tube contains a screen grid element 86 and a cathode 87 the two being connected by a line 88. Each tube also contains a heater element 89 connected as indicated by letters $X_1$, $X_2$, to the secondaries 23, 24, 25, 26 of transformer 22. Between the screen grid element and the cathode in each tube are control grid elements 90, 91 and 92. Mica condensers 93, 94 and 95 connected as shown between the control grids and cathodes in each tube stabilize the control grids and maintain them at a negative potential.

A line 96 is connected from control grid 90 of tube 83 to plate line 77 and includes a condenser 97, a potentiometer 98, a fixed resistor 99, and a second condenser 100. A line 101 is connected between control grid 91 of tube 84 to plate line 78 and includes a potentiometer 102, a fixed resistor 103 and a condenser 104, all of which are identical in rating with the similarly placed units in the line 96 of control grid 90. Line 101 is coupled to line 96 by a condenser 105.

A line 106 is connected from the control grid 92 in tube 85 to its plate line 79 and includes a condenser 107, a potentiometer 108, a fixed resistor 109 and a second condenser 110, all of which are identical in rating with the similarly placed units in grid control circuits of the other two tubes.

The cathodes 89 of the tubes 83, 84 and 85 are connected by lines 111 to a common line 112. Inserted in line 112 which leads to positive load terminal 113 are an ammeter 114, a choke coil 115, and a fuse 116. The negative load terminal 117 is connected by line 118 to the secondaries of transformer 38. Interposed in line 118 is a protective fuse 119. A voltmeter 120 and two parallel connected lamps 121 are connected across lines 112 and 118.

The combinations of condenser 100 and resistor 99, condenser 104 and resistor 103, and condenser 110 and resistor 109, act as ionic shock absorbers in the commutation cushion circuit formed by the control grid and plate of each tube by lines 96, 101 and 106. As previously mentioned the condensers 93, 94 and 95 maintain a negative potential on each grid. The A. C. grid voltage for phase-shift displacement is evident between tubes 83 and 85. The plate current from plate 80 flows through ionic shock absorber combination condenser 100 and resistor 99 through potentiometer 98 and condenser 11 to control grid 90. Since tube 83 is coupled to the control grid 91 of tube 84 by the condenser 105 in order to maintain the phase shift voltage relationship between individual anode control potentiometers 102 and 98, the output voltage is adjusted while potentiometer 108 is set at its maximum voltage position for the tube 85 grid current of ionization.

Since the grid circuit of all three control grids is series closed or delta type interlocked with the ionic shock absorbers, grid currents of ionization on all control grids are proportional in respect to load requirements. Load surges on anodes 80, 81 and 82 lower the I R drops and potential conditions on potentiometers 102 and 98. The instantaneous voltage rise characteristic is applied on control grids 90, 91 and 92, and the effective grid current of ionization effects an instantaneous commutation. Consequently a constant voltage output with instantaneous voltage regulation is obtained by the rectifier.

Any receding current requirements will not affect output voltage because of the phase-shift retardation on potentiometers 102 and 98. Potentiometer 108 is a vernier voltage adjustment and is always set to its maximum voltage position with regard to tube 85.

The lamps 121 are used as a minimum linear resistive load to permit use of the rectifier where load conditions may be only in the order of a few milliamperes. Under such an extremely low load requirement voltage ranges and controls operate with a slight loss of voltage range.

The feature of the rectifier regarding long tube life and efficiency is obtained by an inverse peak voltage minimizing effect of the ionic shock absorbers previously described. Peak inverse voltage conditions lead the normal sized positively charged ions to be attracted to the anodes in the conventional manner but the larger sized positively charged ions, when they go through this extreme potential drop, accelerate themselves greatly and impinge upon the plates of the various tubes with damaging effect. Also the disturbances thus caused lead to disintegration of the cathodes of the tubes with a consequent lowering of effective emission tending to approach total tube failure.

To overcome such detrimental effects to the tubes in this rectifier the related voltage on grid phase shift retardation is constantly triggered by a series connected ionic shock absorber which limits or dampens the speed of the large size positively charged ions to a low rate of ionization or bombardment. Also, secondary ionic emissions are held at a low level through the blocking action of the screen grids 86. This cushioning or dampening effect promotes ionic control and stability eliminating the possibility of any damage to the plates and disintegration of the cathode surface which normally results from sharp fluctuations in load requirements.

The system as shown is connected to a three phase, 220 volt 60 cycle source 1. The lines 61, 62 and 63 as shown connected to terminals 48, 49 and 50 on block 51 make possible a regulated D. C. output voltage over a range of 180 to 250 volts. If the lines 61, 62 and 63 are connected to terminals 52, 53 and 54 the D. C. voltage is changed to a range of 70 to 135 volts. This change in range is effected by the changeover from maximum to partial tap positions on the secondaries 39, 40 and 41 of transformer 38.

A polyphase rectifier is thus provided which insures long tube life, has no phase-back or arc-back deficiencies, gives no change in voltage output due to line voltage fluctuations, maintains a constant torque curve linearity in response to continuously varying D. C. load conditions, has two voltage ranges and has reliable and trouble free grid control stability, unaffected by any type of load application.

I claim:

1. A polyphase grid controlled rectifier for supplying a self regulated D. C. output voltage, comprising time delay means for controlling the flow of current through said rectifier, rectifying tubes each including a control grid for changing an A. C. input to a D. C. output, means associated with said time delay means to prevent current flow from the tubes until said tubes have been predeterminedly heated, and means for instantaneously varying the effective grid current of ionization in each tube through its control grid in response to varying load conditions to obtain a D. C. output voltage at a preadjusted constant level.

2. A polyphase grid controlled rectifier for supplying a self regulated D. C. output voltage comprising a plurality of rectifying tubes each including a control grid for changing an A. C. input to a D. C. output and control means for instantaneously varying the effective grid current of ionization of each tube through its control grid for obtaining a D. C. output voltage at a preadjusted constant level.

3. A polyphase grid controlled rectifier for supplying a self regulated D. C. output voltage comprising a plurality of rectifying tubes, each having a cathode and a plate, a control grid for each of said tubes and ionic shock absorber means interconnected between the control grid and plate of each tube for preventing detrimental ionization conditions in the tube due to varying load conditions.

4. A polyphase grid controlled rectifier for supplying a self regulated D. C. output voltage comprising a plurality of rectifying tubes each having a cathode and a plate, a control grid for each of said tubes, voltage adjusting means in series with each of said control grids and an ionic shock absorber means interconnected between the plate and control grid of each tube and including said voltage adjusting means in series therewith for preventing detrimental effects to the plate and cathode in the tubes due to heavy positive ion bombardment under varying load conditions.

5. A polyphase grid controlled rectifier for supplying a self-regulated D. C. output voltage comprising a plurality of rectifying tubes each having a plate and a cathode, a control grid for each of said tubes, a negative bias means connected between the control grid and the cathode in each tube, voltage adjusting means connected to each of said control grids and an ionic shock absorber means interconnected between the plate and control grid of each tube including said voltage adjusting means in series therewith for preventing detrimental ionization conditions in the tubes due to varying load conditions.

6. A polyphase grid controlled rectifier for supplying a self regulated D. C. output voltage comprising a plurality of rectifying tubes each having a plate and a cathode, a control grid for each of said tubes, a negative bias means connected between the control grid and the cathode in each tube, voltage adjusting means in series with each of said control grids and an ionic shock absorber means associated with the control grid and the plate of each tube and in series with said voltage adjusting means for preventing detrimental ionization conditions in the tubes due to varying load conditions and time delay means associated with said rectifying tubes for preventing tube operation before the cathodes of said tubes are sufficiently heated.

7. A polyphase grid controlled rectifier for supplying a self regulated D. C. output voltage comprising three rectifier tubes each having a plate, a cathode, a screen grid, a control grid and a heater, transformer means for supplying current to the heater of each tube, a second transformer means for supplying A. C. power to said tubes, time delay means to prevent A. C. power supply to the tubes until said tubes are sufficiently heated, a pair of output terminals for load connecting purposes, means connecting one of said terminals with the cathodes of the tubes and the other terminal with said transformer means, a condenser connected between the control grid and cathode of each tube to maintain a negative potential on the control grid, an ionic shock absorber in series with a line from the control grid to the plate of each tube, a potentiometer to adjust the voltage across each tube, one of said potentiometers being set at its maximum voltage setting while the other two potentiometers are adjusted to get a phase-back voltage relationship across the other two tubes, and means to interconnect the three control grids in a series closed or delta relationship interlocked with said ionic shock absorbers so that the grid current of ionization on all control grids is proportional to the varying requirements of output current at the load terminals.

8. A polyphase grid controlled rectifier for supplying a self regulated D. C. output voltage comprising three rectifier tubes each having a plate, a cathode, a screen grid, a control grid, and a heater, means to supply current to said heaters, means to supply A. C. power to said tubes after a time delay while said heaters are warming up said tubes, a condenser connected between the control grid and cathode of each tube to maintain a negative potential on the control grid, a line connecting each control grid with the plate of its tube, a condenser and a resistor connected in series in said line for acting jointly as ionic shock absorbers, a potentiometer and a second condenser in series in said lines to said control grids of the first and third tubes, a potentiometer in series in said line connected to the control grid of the second tube, a condenser coupling the grid connected lines of the first and second tubes and means to maintain a phase shift voltage relationship between the anode control potentiometers of the first and second tubes which comprises adjusting the output voltage by means of the first and second tube potentiometers while maintaining the potentiometer of the third tube at its maximum voltage setting.

9. A polyphase grid controlled rectifier for supplying self regulated D. C. output voltage comprising a plurality of rectifier tubes, means to supply an A. C. input voltage to said tubes, means to delay conduction by said tubes until they are sufficiently heated, means associated with said tubes to maintain a phase shift voltage relationship between one tube and the other tubes and means associated with each tube to control the ionization rate in each tube in response to varying load conditions to prevent detrimental effects to the tubes.

10. A polyphase grid controlled rectifier for supplying a self regulated D. C. output voltage comprising three rectifying tubes each having a plate, a cathode, and a heater, a control grid in each of said tubes, a line connecting each control grid with the plate in each tube, a condenser and a fixed resistor in series in each of said lines to act as an ionic shock absorber for their respective tubes, a second condenser and a potentiometer connected in series in the lines of two of said tubes, a potentiometer in series in the line of the third tube for regulating the output voltage setting of the tubes, a condenser for coupling the third tube line to the line of one of the other two tubes, a condenser connected from the control grid to the cathode of each tube for maintaining a negative potential on said control grid, a manual switch for connecting the rectifier to a three phase A. C. power source, a time delay clock being energized by the closing of said switch, a second switch being subsequently closed by energy controlled by said time clock, a transformer having primary coils and secondary coils, means connecting said secondaries with the heaters of the tubes, a second time delay clock, a cooling fan, means connected across one of the primary coils of the transformer for energizing said fan and said second clock, a second transformer having primary coils and secondary coils, means to connect said primary coils to the time clock controlled second switch, maximum and intermediate taps for providing maximum and reduced supply voltage connected to each of the secondaries of said second transformer, a terminal block, two sets of terminals in said block, means for connecting one set of terminals with the maximum taps and the other set of terminals with the intermediate taps, a switch block, means to connect said switch block with either set of terminals on the terminal block, a switch on said switch block, means responsive to the time setting of said second time clock for energizing said last named switch and closing same thereby, means connecting said last named switch for delivering current to the plates of each tube upon the closing of said switch, a positive output terminal, a negative output terminal, means connecting the positive terminal to the cathodes of each tube, a choke coil and an ammeter in series with said last named connecting means, means connecting the negative output terminal with the secondaries of the second transformer, a voltmeter connected across said output terminals, a linear resistance connected across said output terminals, protective fuses in each connecting means to said output terminals and protective fuses connected between the manual switch and the first time delay clock.

FELIX A. OBLOY.

REFERENCES CITED

The following references are of record in the file of this patent:

UNITED STATES PATENTS

| Number | Name | Date |
|---|---|---|
| 1,893,784 | Prince | Jan. 10, 1933 |
| 2,186,815 | Alexanderson | Jan. 9, 1940 |
| 2,095,047 | Winograd | Oct. 5, 1947 |

FOREIGN PATENTS

| Number | Country | Date |
|---|---|---|
| 782,352 | France | Mar. 18, 1935 |